United States Patent
Qing et al.

(10) Patent No.: US 7,706,388 B2
(45) Date of Patent: Apr. 27, 2010

(54) METHOD AND NODE EQUIPMENT FOR GUARANTEEING SERVICE RELIABILITY IN AN END-TO-END QUALITY OF SERVICE FRAMEWORK

(75) Inventors: Wu Qing, Shenzhen (CN); Yuepeng Chen, Shenzhen (CN); Lingyuan Fan, Shenzhen (CN); Dengchao Wu, Shenzhen (CN); Ting Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 579 days.

(21) Appl. No.: 11/639,623

(22) Filed: Dec. 15, 2006

(65) Prior Publication Data

US 2007/0201374 A1    Aug. 30, 2007

(51) Int. Cl.
*H04L 12/28* (2006.01)
(52) U.S. Cl. .................... 370/400; 370/255; 370/410
(58) Field of Classification Search ............ 370/242, 370/243, 244, 245, 248, 252, 255, 257, 258, 370/397, 400, 401, 408, 409
See application file for complete search history.

(56) References Cited

U.S. PATENT DOCUMENTS

| | | | | |
|---|---|---|---|---|
| 7,069,537 B2* | 6/2006 | Lazarov | ..................... | 717/104 |
| 7,440,442 B2* | 10/2008 | Grabelsky et al. | ........... | 370/352 |
| 2003/0031177 A1* | 2/2003 | Robidas et al. | ............ | 370/392 |
| 2003/0212890 A1* | 11/2003 | Dircks et al. | ................ | 713/164 |
| 2004/0015503 A1* | 1/2004 | Smith et al. | .................. | 707/100 |
| 2004/0085908 A1* | 5/2004 | Balasubramanian et al. | | 370/252 |
| 2006/0041661 A1* | 2/2006 | Erikson et al. | .............. | 709/225 |
| 2006/0171323 A1* | 8/2006 | Qian et al. | ................... | 370/252 |
| 2009/0201936 A1* | 8/2009 | Dumet et al. | ............... | 370/401 |

FOREIGN PATENT DOCUMENTS

| | | |
|---|---|---|
| CN | 1156362 | 8/1997 |
| CN | 1499350 | 5/2004 |
| FR | 2846824 | 5/2004 |
| KR | 2003-032636 | 4/2003 |
| KR | 2004-036069 | 4/2004 |
| WO | WO01/10088 | 2/2001 |

* cited by examiner

*Primary Examiner*—Chi H. Pham
*Assistant Examiner*—Kevin Mew
(74) *Attorney, Agent, or Firm*—Finnegan, Henderson, Farabow, Garrett, & Dunner LLP

(57) ABSTRACT

A method for guaranteeing service reliability in an end-to-end Quality of Service framework is provided. The method includes checking whether connection information held in all node equipment gone through by a session connection is consistent. If the connection information is consistent, the consistency check is completed. Otherwise, the inconsistent connection information is released from the node equipment. In the provided method, a consistency check is performed inside every node equipment, and between node equipment in the network, and thus, abnormal resources may be retrieved, so that network service ability will not be affected by abnormal situations. Consistent with the provided method, degradation of service ability because of network abnormity can be avoided, and network reliability and availability can be improved.

15 Claims, 4 Drawing Sheets

METHOD AND NODE EQUIPMENT FOR GUARANTEEING SERVICE RELIABILITY IN AN END-TO-END QUALITY OF SERVICE FRAMEWORK

CROSS REFERENCES TO RELATED APPLICATIONS

This application is a continuation application of International Application No. PCT/CN2005/000879, filed Jun. 20, 2005, which claims priority to Chinese Patent Application No. 200410048778.6, filed Jun. 18, 2004.

FIELD OF THE INVENTION

The invention relates to end-to-end Quality of Service (QoS) control technologies, and especially to a method for guaranteeing service reliability in an end-to-end QoS framework through consistency check.

BACKGROUND OF THE INVENTION

Along with the continuous growth of the Internet, various network services appear, and advanced multimedia systems emerge in endlessly. Because real-time services are relatively sensitive to network characteristic such as transmission latency, delay jitter etc., when there are File Transfer Protocol (FTP) services of high burstiness, or Hypertext Transfer Protocol (HTTP) services with image files on the network, the real-time services may be greatly affected. Besides, since multimedia services may occupy much bandwidth, key services, which need to be guaranteed in the existing network, can not be reliably transmitted. Therefore, in order to guarantee reliable transmission of key services, various QoS technologies arise. The Internet Engineering Task Force (IETF) has proposed a good many service models and mechanisms to meet QoS requirement. At present, a scheme, which adopts an Integrated Service (INT-SERV) model on the access or edge area of a network, and adopts a Differentiated Service (DIFF-SERV) model on the core area of the network, is comparatively approved in the art.

In the Diff-serv model, only a measure of setting priority levels is provided to guarantee the QoS. Although this model has a feature of high line efficiency, the real effectiveness is unpredictable. Therefore, an independent bearer control layer is introduced into the Diff-serv Model of the backbone network in the art, a special set of Diff-serv QoS signaling mechanisms are provided, and also a resource management layer is specially established for the Diff-serv network, which is used for managing topology resources of the network. This Diff-serv mode of resource management is called a Diff-serv model with an independent bearer control layer. FIG. 1 is a schematic diagram of the model. Here, the 101 is a service server, such as a Call Agent (CA), which belongs to the service control layer for implementing functions such as soft switch; the 102 is a bearer network resource manager, which belongs to the bearer control layer; the 103 is an Edge Router (ER) and the 104 is a Core Router, both of which belong to the bearer network. In this model, the bearer network resource manager is responsible for configuring management policies and network topology, allocating resources for service bandwidth applications of customers. The service bandwidth application requests and results of customers, and the path information of service applications, etc., which are allocated by every bearer network resource manager, are delivered via signaling between bearer network resource managers of each control domain.

When processing a service bandwidth application request from a user, the bearer control layer will assign a path for the service, and then the bearer network resource manager will inform the ER to forward the service stream according to the assigned path. How could the bearer layer transfer the service stream with reference to the path assigned by the bearer control layer? At present, an existing approach in the art is to use the Multi-protocol Label Switching (MPLS) technique, and with a resource reservation mode, establishing a Label Switched Path (LSP) along the service stream path assigned by the bearer control layer, where the end-to-end LSP is set up by using explicit route mechanisms, such as the Resource Reservation Protocol-traffic engineering (RSVP-TE) or the constraint-based routed Label Switched Path (CR-LDP).

In a multi-layer network structure, especially when the control layer and the bearer layer are separated, the procedure for establishing a session connection includes: interaction between service control layer entities, interaction between bearer control layer entities, interaction between service control layer entities and bearer control layer entities, and interaction between bearer control layer entities and bearer layer entities. Every entity involved may keep information related to the session connection, for example, the service control layer may reserve session establishment information, the bearer control layer may preserve session resource establishment information, and a bearer layer entity may preserve policy information of session data flow. All the information should be consistent. When certain node equipment is abnormal during information processing procedure, such as resource releasing, the information on the network will be inconsistent. In this case, resources allocated by some nodes for the session connection, including memories, buffers and bandwidth etc, cannot be released in time, and thus, the resources may be hung up.

At present, cold backup is one of the simplest methods to guarantee service reliability, which means using one entity as a complete backup of another entity. For example, entity B is taken as a backup entity of entity A, and when entity A fails, the backup entity B will totally substitute for entity A. Nevertheless, for the backup entity B, a premise to totally substitute for entity A is to rebuild both the bearer connection and the service connection. The cold backup method is the most effective routing mechanism and easy to implement in the initial stage of network construction, because at this stage the network is small, the real-time requirement for service is not critical, and switching and smoothing are not needed, as well. Therefore, the cold backup method is competent in the case when traffic volume is low, and interruption is allowed. However, along with the growth of traffic volume, and the expanding of real-time services, which are not expected by users to be interrupted, the deficiency of cold backup method appears gradually. That is, in the face of this situation, a device failure may occur, and services should be interrupted and rebuilt. Thus, if the cold backup method is adopted in a wide area network which is complex and of critical real-time requirement, services will be interrupted and rebuilt when a certain section of bearer network fails.

SUMMARY

The invention provides a method for guaranteeing service reliability in an end-to-end Quality of Service framework, to prevent resource inconsistency caused by abnormity of a network with multi-layers for all node equipment.

A method for guaranteeing service reliability in an end-to-end Quality of Service framework, including:

checking whether connection information held in all node equipment gone through by a session connection is consistent; if it is, finishing the consistency check; otherwise, releasing the inconsistent connection information from these node equipment.

The step of checking whether connection information held in all node equipment gone through by a session connection is consistent includes:

A1. selecting a piece of node equipment from all the node equipment gone through by the session connection, and sending a consistency check request to the selected node equipment;

B1. the selected node equipment, which has received the consistency check request, determining whether the connection information preserved in every module of itself is consistent; if it is, executing Step C1; otherwise, releasing the inconsistent connection information before executing Step C1;

C1. determining whether the consistency check request is sent from an adjacent node equipment of the selected node equipment; if it is, returning a response message including connection information of the selected node equipment to the adjacent node equipment, and executing Step D1; and if the selected node equipment has received a response message from one of its adjacent node equipment as well, executing Step D1; otherwise, executing Step E1;

D1. based on the connection information carried in the received response message, the selected node equipment determining whether the connection information of itself is consistent with that of its adjacent node equipment; if it is, executing Step E1; otherwise, releasing the inconsistent connection information held in itself, informing to release the inconsistent connection information from the adjacent node equipment, and executing Step E1;

E1. deciding whether there is any other adjacent node equipment of the selected node equipment that has not implemented inter-node consistency check; if there is, sending a consistency check request to the adjacent node equipment, and executing Step B1; otherwise, ending the procedure of consistency check.

The step of checking whether connection information held in all node equipment gone through by a session connection is consistent includes:

performing consistency check inside every node equipment, and performing inter-node consistency check between every two node equipment for all the node equipment gone through by the session connection.

The step of performing consistency check inside every piece of node equipment for all the node equipment gone through by the session connection includes:

A2. selecting the most upstream node equipment among all the node equipment gone through by the session connection as a selected node equipment, and sending a consistency check request to the selected node equipment;

B2. the selected node equipment, which has received the consistency check request, determining whether the connection information preserved in every module of itself is consistent; if it is, executing Step C2; otherwise, releasing the inconsistent connection information;

C2. determining whether there is any downstream node equipment of the selected node equipment; if there is, sending a consistency check request to the downstream node equipment, and executing Step B2; otherwise, performing inter-node consistency check between every two node equipment.

The step of performing inter-node consistency check between every two pieces of node equipment includes:

D2. determining whether there is any upstream node equipment of the selected node equipment; if there is, the selected node equipment returning a consistency check response including check result of itself to the upstream node equipment, and executing E2; otherwise, finishing the consistency check, and ending the procedure;

E2. the upstream node equipment, which has received the consistency check response, determining whether the connection information of itself is consistent with the connection information held in the selected node equipment based on the check result carried in the consistency check response; if it is, taking the upstream node equipment as a new selected node equipment, and executing Step D2; otherwise, releasing the inconsistent connection information of the upstream node equipment, informing to release the inconsistent connection information from the selected node equipment, taking the upstream node equipment as a new selected node equipment, and executing Step D2.

In this invention, consistency check is performed inside every node equipment, and between node equipment in the network, and thus, abnormal resources may be retrieved, so that network service ability will not be affected by abnormal conditions. When the network is of large scope, consistency check can be done according to signaling flow sequence for establishing a session connection. When an inconsistent situation is detected, the node equipment gives a feedback to its upstream node equipment. Usually, there is a great quantity of sessions on a network, so it is better to carry out consistency check in batch for decreasing spending. With this method, degradation of service ability because of network abnormity can be avoided, and network reliability and availability can be improved, which is of great economic benefits.

EMBODIMENTS OF THE INVENTION

Figure 1:
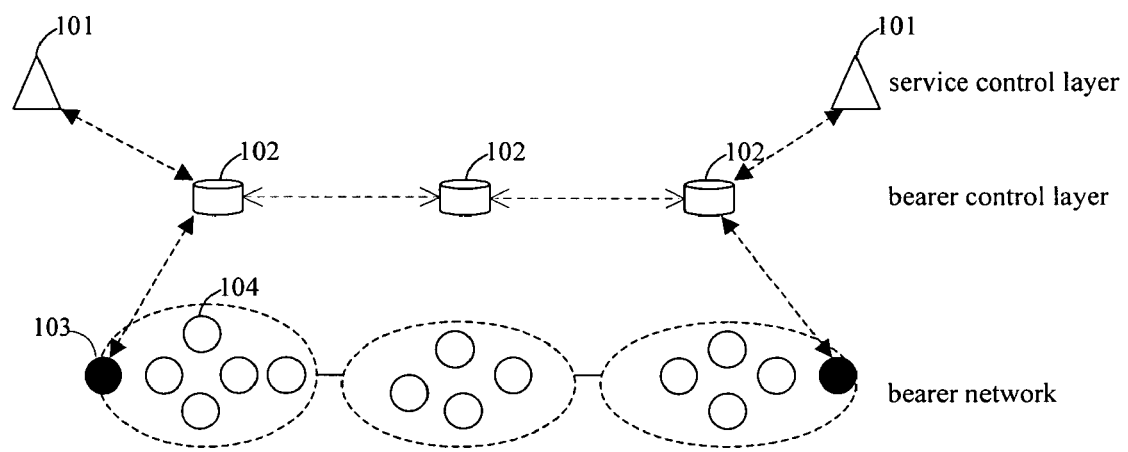
FIG. 1 is a network model with an independent bearer control layer in prior art.

In order to make the object, technical scheme and merits clearer, the invention will be described hereinafter in detail with reference to accompanying drawings.

The procedure of an embodiment is as follows: determining whether connection information in all node equipment a session connection goes through is consistent; if it is consistent, passing the consistency check; otherwise, releasing the inconsistent connection information from every piece of node equipment. Specifically, consistency check inside every node equipment, which is called as interior consistency check, may firstly be initiated to determine whether connection information stored in every module of a node equipment is consistent; if it is consistent, conducting no processing, and finishing the consistency check inside every node equipment; and if it is inconsistent, releasing the inconsistent connection information from each module of the node equipment. After completing the interior consistency check, the node equipment initiates consistency check for relevant node equipment connecting with itself. And after the relevant node equipment determines that the connection information preserved in every module of itself is consistent, the relevant node equipment may compare the self-stored connection information with the connection information stored in the node equipment initiating the consistency check; if they are inconsistent, release the inconsistent connection information stored in every module of the relevant node equipment; otherwise, pass the consistency check.

Furthermore, the connection information stored in each module of a node equipment, which is the resource information the node equipment allocated for a session connection, may contain the following one or more conditions: occupation of bandwidth, usage of a memory and/or buffer, data consistency in a database, status consistency of an interface etc. And the connection information to be checked between node equipment contains information such as session identifier, resources allocated for the session etc. Of course, the specific information to be checked in an interior consistency check which is performed inside node equipment, or in an inter-node consistency check which is performed between node equipment can be set beforehand, and it is not specified here.

The consistency check can be initiated by a timer or according to demands of an operator. The consistency check may be done inside node equipment, which is called as interior consistency check; or between node equipment, which is called as inter-node consistency check. When the consistency check is done between node equipment, it starts from the most upstream node equipment of the network, and then gradually implemented from downstream node equipment connected with the most upstream node equipment, to the most downstream node equipment. Certainly, the consistency check can also start from middle node equipment, and sequentially executed in upstream node equipment and downstream node equipment connected with the middle node equipment, respectively; or from the most downstream node equipment, and then gradually initiated from upstream node equipment connected with the most downstream node equipment, to the most upstream node equipment. Here, downstream refers to the direction of the signaling flow sequence for establishing a session, whereas upstream refers to a direction opposite to the signaling flow sequence for establishing a session.

The procedure of consistency check in this embodiment may include: performing consistency check inside every piece of node equipment for all the node equipment gone through by a session connection, and performing inter-node consistency check between every two adjacent node equipment.

Figure 2:
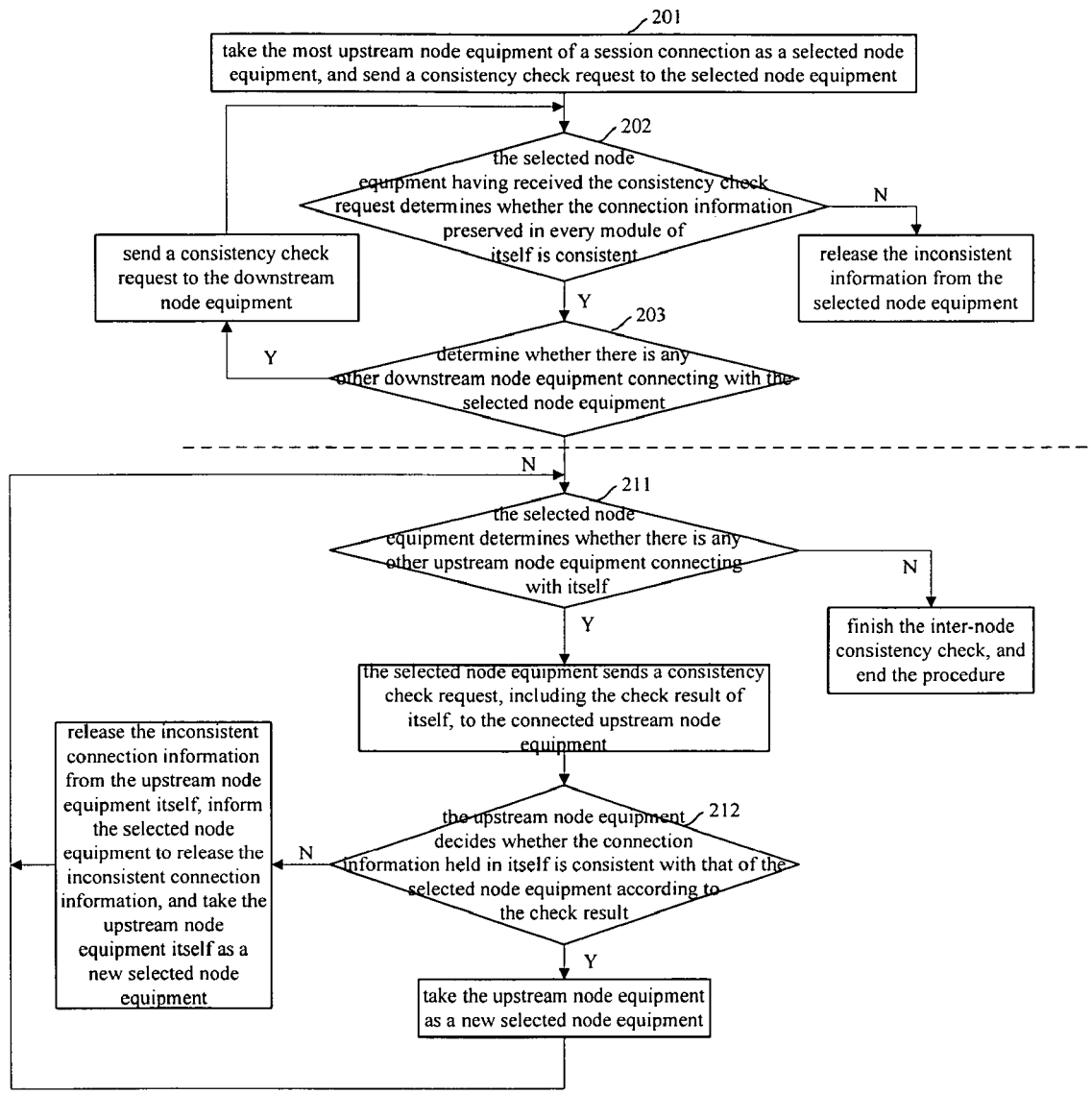
FIG. 2 is a schematic diagram illustrating a procedure of an embodiment for implementing consistency check inside every piece of node equipment and between node equipment.

Referring to FIG. 2, procedures of consistency check inside a node and between nodes are described hereinafter, respectively.

As shown in FIG. 2, the procedure of an embodiment for implementing consistency check inside any one of the node equipment passed through by an established session connection includes:

Step 201: Take the most upstream node equipment of a session connection as a selected node equipment, and send a consistency check request to the selected node equipment.

Step 202: The selected node equipment having received the consistency check request determines whether the connection information preserved in every module of itself is consistent; if it is consistent, execute Step 203; otherwise, release the inconsistent information from the selected node equipment.

Step 203: Determine whether there is any other downstream node equipment connecting with the selected node equipment; if there is, send a consistency check request to the downstream node equipment, and then execute Step 202; otherwise, perform inter-node consistency check between every two pieces of node equipment, and then finish the consistency check.

In this embodiment, the procedure for implementing inter-node consistency check between every two pieces of node equipment includes:

Step 211: The selected node equipment determines whether there is any other upstream node equipment connecting with itself; if there is, the selected node equipment sends a consistency check request, including the check result of itself, to the connected upstream node equipment, and then execute Step 212; otherwise, finish the inter-node consistency check, and end the procedure.

Step 212: Having received the consistency check response, the upstream node equipment decides whether the connection information held in itself is consistent with that of the selected node equipment according to the check result; if it is, take the upstream node equipment as a new selected node equipment, and execute Step 211; otherwise, release the inconsistent connection information from the upstream node equipment itself, inform the selected node equipment to release the inconsistent connection information, and take the upstream node equipment itself as a new selected node equipment, then execute Step 211.

Figure 3:
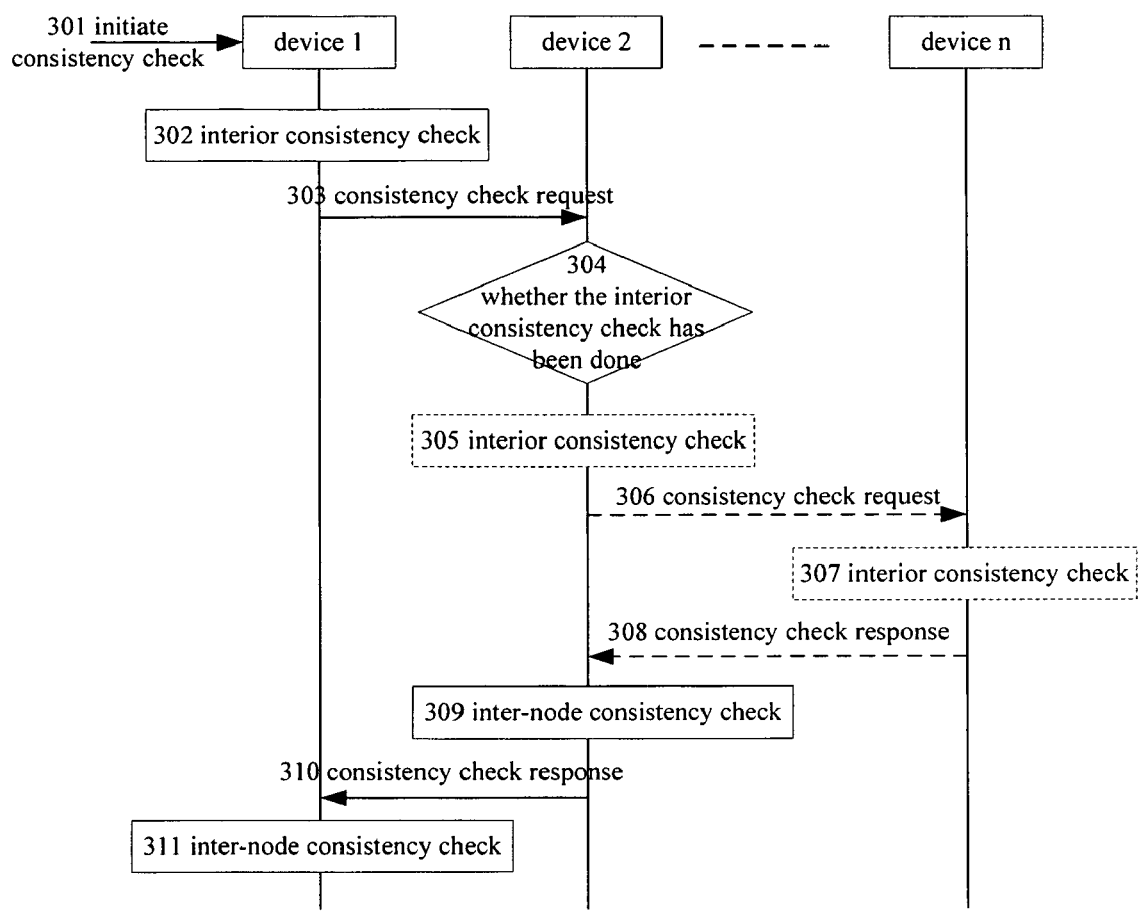
FIG. 3 is a schematic diagram illustrating a procedure of the first embodiment of the invention.

As shown in FIG. 3, the procedure of an embodiment for implementing consistency check initiated from the most upstream node equipment includes:

Step 301: Initiate consistency check by a timer, which is preset in a functional entity of application layer, or according to demands, i.e., send a consistency check request to device 1. Since process spending is unavoidable in the consistency check, it is suggested to start the check at the time of low traffic volume.

Step 302: Having received the consistency check request, device 1 initiates a consistency check between modules and/or boards of itself, and decides whether the connection information in the modules and/or boards is consistent; if it is consistent, execute Step 303; otherwise, release the inconsistent information from all the modules and/or boards, and then execute Step 303.

Step 303: Device 1 initiates consistency check for other devices connecting with itself, i.e., device 1 sends a consistency check request to its downstream device, namely device 2.

Step 304: Having received the consistency check request, device 2 determines whether the interior consistency check has been done by itself, if it hasn't, initiate the interior consistency check, and execute Step 305; otherwise, execute Step 306.

Step 305: Device 2 determines whether the connection information preserved in all modules and/or boards is consistent; if it is inconsistent, device 2 may take back the inconsistent resource, i.e., release the inconsistent connection information, and then execute Step 306; otherwise, directly execute Step 306.

Step 306: Device 2 initiates consistency check for its downstream device, namely device 3, and then executes Steps 304 and 305. This step is orderly implemented from device 2 to device n.

Steps 307~308: Having executed Steps 304 and 305, and completed the interior consistency check, device n returns a consistency check response containing the consistency check result to its directly connected upstream device, namely device n−1. Here, the consistency check result can include connection information and information on whether the connection information is consistent etc.

Steps 309~310: Device n-1 compares the consistency check result received from device n with the connection information stored in itself; if they are consistent, device n-1 directly returns a consistency check response containing the consistency check result to the connected upstream device, namely device n-2; if they are inconsistent, device n-2 releases the inconsistent connection information from itself, informs device n-1 to release the corresponding inconsistent connection information, and sends a consistency check response to the upstream device. The same procedure will be repeated from device n-2 till device 1.

Step 311: Device 1 compares the received consistency check result with the connection information of itself; if they are consistent, end the consistency check; otherwise, release the inconsistent connection information of itself, and informs device 2 to release the corresponding inconsistent connection information, and then end the consistency check.

Figure 4:
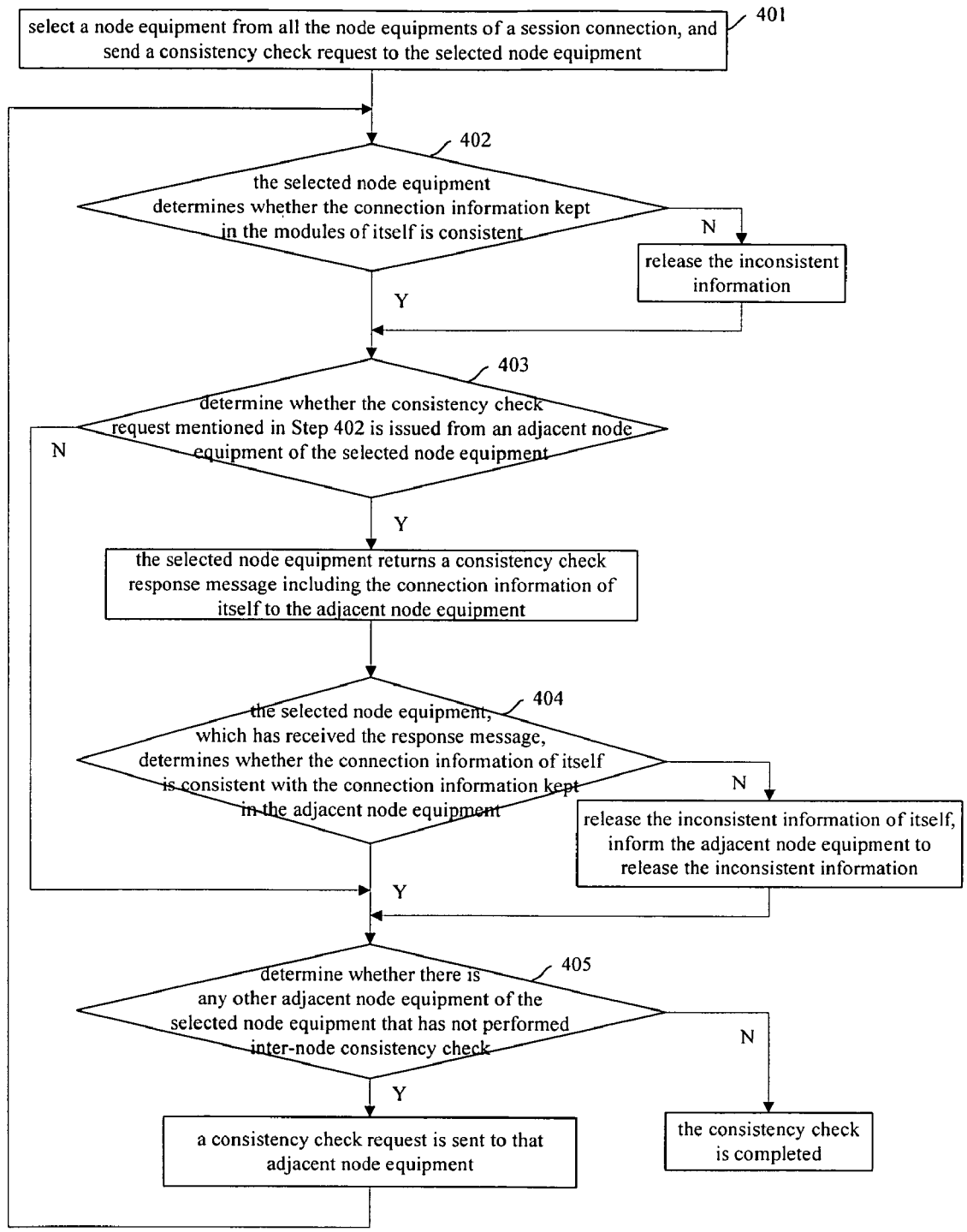
FIG. 4 is a schematic diagram illustrating a procedure of the second embodiment of the invention.

Of course, there are different approaches to implement consistency check of connection information for all node equipment the session connection passes through. As shown in FIG. 4, the procedure of another embodiment is as follows:

Step 401: Choose node equipment from all the node equipment of a session connection, which is referred to as a selected node equipment, and send a consistency check request to the selected node equipment.

Step 402: Having received the consistency check request, the selected node equipment determines whether the connection information kept in the modules of itself is consistent; if it is consistent, execute Step 403; otherwise, release the inconsistent information, and then execute Step 403.

Step 403: Determine whether the consistency check request mentioned in Step 402 is issued from an adjacent node equipment of the selected node equipment; if it is, the selected node equipment returns a consistency check response message including the connection information of itself to the adjacent node equipment, and executes Step 404. And if the selected node equipment has also received a consistency check response message from the adjacent node equipment, execute Step 404; otherwise, execute Step 405.

Step 404: The selected node equipment, which has received the response message, determines whether the connection information of itself is consistent with the connection information kept in the adjacent node equipment; if they are consistent, execute Step 405; otherwise, release the inconsistent information of itself, inform the adjacent node equipment to release the inconsistent information, and then execute Step 405.

Step 405: Determine whether there is any other adjacent node equipment of the selected node equipment that has not performed inter-node consistency check; if there is, a consistency check request is sent to that adjacent node equipment, and then Step 402 is executed; if there isn't, the consistency check is completed. In this embodiment, consistency check is performed inside every piece of node equipment, and between node equipment in the network, and thus, abnormal resources may be retrieved, so that network service ability will not be affected by abnormal situations. Moreover, when the network is of large scope, consistency check can be done according to signaling flow sequence for establishing a session connection. When an inconsistent situation is detected, the node equipment gives a feedback to its upstream node equipment. Usually, there is a great quantity of sessions on a network, so it is better to carry out consistency check in batch for decreasing spending. With this method, degradation of service ability because of network abnormity can be avoided, and network reliability and availability can be improved, which is of great economic benefits.

To sum up, what have been mentioned above are only embodiments of the invention, and it is not to limit the protection scope of this invention.

The invention claimed is:

1. A method for guaranteeing service reliability in an end-to-end Quality of Service (QoS) framework, comprising:
    performing a consistency check comprising checking whether connection information held in all node equipment gone through by a session connection is consistent; if it is, finishing the consistency check; otherwise, releasing the inconsistent connection information from every node equipment;
    wherein checking whether connection information held in all node equipment gone through by a session connection is consistent comprises:
    A1. selecting a piece of node equipment from all the node equipment gone through by the session connection, and sending a consistency check request to the selected node equipment;
    B1. the selected node equipment, which has received the consistency check request determining whether the connection information reserved in every module of itself is consistent; if it is, executing Step C1; otherwise, releasing the inconsistent connection information before executing Step C1;
    C1. determining whether the consistency check request is sent from an adjacent node equipment of the selected node equipment; if it is, returning a response message including connection information of the selected node equipment to the adjacent node equipment, and executing Step D1; and if the selected node equipment has received a response message from one of its adjacent node equipment as well, executing Step D1; otherwise, executing Step E1;
    D1. based on the connection information carried in the received response message, the selected node equipment determining whether the connection information of itself is consistent with that of its adjacent node equipment; if it is executing Step E1; otherwise, releasing the inconsistent connection information held in itself, informing to release the inconsistent connection information from the adjacent node equipment, and executing Step E1;
    E1. deciding whether there is an other adjacent node equipment of the selected node equipment that has not implemented inter-node consistency check; if there is, sending a consistency check request to the adjacent node equipment, and executing Step B1; otherwise, ending the procedure of consistency check.

2. The method according to claim 1, wherein the adjacent node equipment is an upstream and/or downstream node equipment of the selected node equipment.

3. A method for guaranteeing service reliability in an end-to-end Quality of Service (QoS) framework, comprising:
    performing a consistency check comprising checking whether connection information held in all node equipment gone through by a session connection is consistent; if it is, finishing the consistency check; otherwise, releasing the inconsistent connection information from every node equipment;
    wherein checking whether connection information held in all node equipment gone through by a session connection is consistent comprises:
    performing a consistency check inside every node equipment, and performing an inter-node consistency check between every two node equipment for all the node equipment gone through by the session connection.

4. The method according to claim 3, wherein performing the consistency check inside every piece of node equipment for all the node equipment gone through by the session connection comprises:

A2. selecting a most upstream node equipment among all the node equipment gone through by the session connection as a selected node equipment, and sending a consistency check request to the selected node equipment;

B2. the selected node equipment, which has received the consistency check request, determining whether the connection information preserved in every module of itself is consistent; if it is, executing Step C2; otherwise, releasing the inconsistent connection information;

C2. determining whether there is any downstream node equipment of the selected node equipment; if there is, sending a consistency check request to the downstream node equipment, and executing Step B2; otherwise, performing the inter-node consistency check between every two node equipment.

5. The method according to claim 4, wherein performing the inter-node consistency check between every two pieces of node equipment comprises:

D2. determining whether there is any upstream node equipment of the selected node equipment; if there is, the selected node equipment returning a consistency check response including check result of itself to the upstream node equipment, and executing E2; otherwise, finishing the consistency check, and ending the procedure;

E2. the upstream node equipment, which has received the consistency check response, determining whether the connection information of itself is consistent with the connection information held in the selected node equipment based on the check result carried in the consistency check response; if it is, taking the upstream node equipment as a new selected node equipment, and executing Step D2; otherwise, releasing the inconsistent connection information of the upstream node equipment, informing to release the inconsistent connection information from the selected node equipment, taking the upstream node equipment as a new selected node equipment, and executing Step D2.

6. The method according to claim 4, wherein the consistency check request sent to the selected node equipment is initiated by a timer, which is set within a functional entity of application layer, or according to demands of an operator.

7. The method according to claim 3, wherein performing the consistency check inside every piece of node equipment for all the node equipment gone through by the session connection comprises:

A3. selecting a most downstream node equipment among all the node equipment gone through by the session connection as a selected node equipment, and sending a consistency check request to the selected node equipment;

B3. the selected node equipment, which has received the consistency check request, determining whether the connection information preserved in every module of itself is consistent; if it is, executing Step C3; otherwise, releasing the inconsistent connection information;

C3. determining whether there is any upstream node equipment of the selected node equipment; if there is, sending a consistency check request to the upstream node equipment, and executing Step B3; otherwise, performing inter-node consistency check between every two node equipment.

8. The method according to claim 7, wherein performing the inter-node consistency check between every two pieces of node equipment comprises:

D3. determining whether there is any downstream node equipment of the selected node equipment; if there is, the selected node equipment returning a consistency check response including a check result of itself to the downstream node equipment, and executing E3; otherwise, finishing the consistency check, and ending the procedure;

E3. the downstream node equipment, which has received the consistency check response, determining whether the connection information of itself is consistent with the connection information held in the selected node equipment based on the check result carried in the consistency check response; if it is, taking the downstream node equipment as a new selected node equipment, and executing Step D3; otherwise, releasing the inconsistent connection information of the downstream node equipment, informing to release the inconsistent connection information from the selected node equipment, taking the downstream node equipment as a new selected node equipment, and executing Step D3.

9. The method according to claim 7, wherein the consistency check request sent to the selected node equipment is initiated by a timer, which is set within a functional entity of application layer, or according to demands of an operator.

10. The method according to claim 1, wherein the connection information comprises resource information allocated for the session connection by every piece of node equipment.

11. The method according to claim 10, wherein the resource information comprises the following one or more conditions: occupation of bandwidth, usage of a memory and/or buffer, data consistency in a database, status consistency of an interface.

12. A method for guaranteeing service reliability in an end-to-end Quality of Service framework, comprising:

A. selecting a piece of node equipment from all the node equipment gone through by the session connection, and sending a consistency check request to the selected node equipment;

B. the selected node equipment, which has received the consistency check request, determining whether the connection information preserved in every module of itself is consistent; if it is, executing Step C; otherwise, releasing the inconsistent connection information before executing Step C;

C. determining whether the consistency check request is sent from an adjacent node equipment of the selected node equipment; if it is, returning a response message including connection information of the selected node equipment to the adjacent node equipment, and executing Step D; and if the selected node equipment has received a response message from one of its adjacent node equipment as well, executing Step D; otherwise, executing Step E;

D. based on the connection information carried in the received response message, the selected node equipment determining whether the connection information of itself is consistent with that of its adjacent node equipment; if it is, executing Step E; otherwise, releasing the inconsistent connection information held in itself, informing to release the inconsistent connection information from the adjacent node equipment, and executing Step E;

E. deciding whether there is any other adjacent node equipment of the selected node equipment that has not implemented inter-node consistency check; if there is, sending a consistency check request to the adjacent node equipment, and executing Step B; otherwise, ending the procedure of consistency check.

13. Node equipment for guaranteeing service reliability in an end-to-end Quality of Service framework, comprising:
   a first unit, configured to determine whether connection information preserved in every module of the node equipment is consistent after receiving a consistency check request, and releasing the inconsistent connection information;
   a second unit, configured to return a response message including connection information of the node equipment to an adjacent node equipment when the consistency check request is sent from the adjacent node equipment; and
   a third unit, configured to receive a response message from the adjacent node equipment including connection information of the adjacent node equipment, determining whether the connection information of itself is consistent with that of the adjacent node equipment, and when the connection information of itself and that of the adjacent node equipment is inconsistent, releasing the inconsistent connection information held in itself, and informing the adjacent node equipment to release the inconsistent connection information.

14. The method according to claim 3, wherein the connection information comprises resource information allocated for the session connection by every piece of node equipment.

15. The method according to claim 14, wherein the resource information comprises the following one or more conditions: occupation of bandwidth, usage of a memory and/or buffer, data consistency in a database, or status consistency of an interface.

* * * * *